(12) United States Patent
Reed et al.

(10) Patent No.: US 12,375,478 B2
(45) Date of Patent: Jul. 29, 2025

(54) QUORUM-BASED AUTHORIZATION TO SECURE SENSITIVE CLOUD ASSETS

(71) Applicant: THALES DIS CPL USA, INC., Austin, TX (US)

(72) Inventors: Wayne Reed, Kemptville (CA); Robert Burns, Gainesville, FL (US); Marc Boillot, Plantation, FL (US); Hugot Didier, Le Plessis Robinson (FR)

(73) Assignee: THALES DIS CPL USA, INC., Austin, TX (US)

( * ) Notice: Subject to any disclaimer, the term of this patent is extended or adjusted under 35 U.S.C. 154(b) by 419 days.

(21) Appl. No.: 17/855,887

(22) Filed: Jul. 1, 2022

(65) Prior Publication Data
US 2024/0007461 A1    Jan. 4, 2024

(51) Int. Cl.
*H04L 9/40*    (2022.01)
*G06F 9/54*    (2006.01)
*G06F 21/40*    (2013.01)

(52) U.S. Cl.
CPC .......... *H04L 63/0846* (2013.01); *G06F 9/547* (2013.01); *G06F 21/40* (2013.01); *H04L 63/107* (2013.01); *H04L 63/108* (2013.01)

(58) Field of Classification Search
CPC . H04L 63/0209; H04L 63/08; H04L 63/0846; H04L 63/107; H04L 63/108; H04L 63/1441; H04L 2463/082; G06F 21/40; G06F 9/547
See application file for complete search history.

(56) References Cited

U.S. PATENT DOCUMENTS

| | | | | |
|---|---|---|---|---|
| 5,825,880 A | * | 10/1998 | Sudia | G06F 21/64 713/180 |
| 5,867,578 A | * | 2/1999 | Brickell | H04L 9/3265 713/180 |
| 6,775,668 B1 | * | 8/2004 | Goel | G06F 21/6227 707/999.009 |

(Continued)

FOREIGN PATENT DOCUMENTS

EP    3429156 A1    1/2019

OTHER PUBLICATIONS

International Search Report (PCT/ISA/2010) & Written Opinion (PCT/ISA/237) mailed by ISA/EP on Sep. 27, 2023 for corresponding International Application pursuant to the PCT, N°PCT/US2023/025930 (14 pages).

*Primary Examiner* — David Garcia Cervetti

(57) ABSTRACT

Provided is a system and method to authenticate multiple users in order to secure sensitive cloud assets. The system comprises a user device, a service provider, and an identify provider. The service provider provides services for producing and consuming data. The identify provider authenticates and authorizes multiple authorizors for providing user access to the resources and data. A device app communicates with the service provider and identify provider. The device app polls votes and determines when a quorum approval for utilizing data is met within a constraint. It authorizes the user temporary access to the data for use by one of the services upon quorum approval, and enforces temporal and physical conditions on it. The access can be granted via a push action or a pull notification. Other embodiments are disclosed.

11 Claims, 7 Drawing Sheets

(56) References Cited

U.S. PATENT DOCUMENTS

| | | | |
|---|---|---|---|
| 7,136,489 B1* | 11/2006 | Madhusudhana | H04L 9/3218 380/278 |
| 7,975,288 B2* | 7/2011 | Viavant | G06F 21/40 713/172 |
| 8,365,258 B2* | 1/2013 | Dispensa | H04L 63/0869 705/72 |
| 8,474,028 B2* | 6/2013 | Kulkarni | H04L 9/3215 705/68 |
| 8,745,379 B2 | 6/2014 | Orsini et al. | |
| 9,547,847 B2* | 1/2017 | Ristock | H04L 67/54 |
| 9,785,510 B1* | 10/2017 | Madhavarapu | G06F 3/065 |
| 9,807,610 B2* | 10/2017 | Rasheed | G06F 21/35 |
| 9,866,392 B1 | 1/2018 | Campagna | H04L 9/14 |
| 10,171,457 B2* | 1/2019 | Moore | H04L 63/0807 |
| 10,216,949 B1* | 2/2019 | McKelvie | G06F 21/6218 |
| 10,223,184 B1* | 3/2019 | McKelvie | G06F 3/0659 |
| 10,291,622 B1* | 5/2019 | Rossman | H04L 63/102 |
| 10,341,313 B2* | 7/2019 | Kojima | H04L 63/0823 |
| 10,455,025 B2* | 10/2019 | Burch | H04L 63/18 |
| 10,482,231 B1* | 11/2019 | Harding | G06F 21/335 |
| 10,581,924 B2 | 3/2020 | Gaddam et al. | |
| 10,606,994 B2* | 3/2020 | Kurian | G06F 21/32 |
| 10,728,038 B2* | 7/2020 | Tomlinson | H04L 9/0894 |
| 10,771,444 B2* | 9/2020 | Schiffman | H04L 63/0853 |
| 10,834,063 B2* | 11/2020 | Hancock | H04L 63/0853 |
| 10,885,220 B2 | 1/2021 | Sharma et al. | |
| 10,887,110 B2* | 1/2021 | Wainblat | H04L 9/3268 |
| 10,992,670 B1* | 4/2021 | Drooger | H04L 63/0428 |
| 11,019,068 B2 | 5/2021 | Rossman et al. | |
| 11,082,235 B2 | 8/2021 | Monica et al. | |
| 11,096,052 B2 | 8/2021 | Gaudet et al. | |
| 11,468,435 B1* | 10/2022 | Cheng | H04L 9/0827 |
| 11,568,038 B1* | 1/2023 | Kulkarni | H04L 9/3271 |
| 11,914,696 B1* | 2/2024 | Saxe | G06F 9/4843 |
| 2005/0204129 A1* | 9/2005 | Sudia | H04L 9/3255 713/158 |
| 2005/0271067 A1 | 12/2005 | King et al. | |
| 2005/0278536 A1* | 12/2005 | Canard | H04L 9/3257 713/180 |
| 2006/0184787 A1* | 8/2006 | Sandhu | H04L 9/3271 713/155 |
| 2007/0250920 A1 | 10/2007 | Lindsay | |
| 2010/0325441 A1* | 12/2010 | Laurie | H04L 9/3257 713/185 |
| 2011/0321131 A1* | 12/2011 | Austel | G06F 21/33 726/4 |
| 2013/0081114 A1* | 3/2013 | Bell | H04W 12/06 726/5 |
| 2013/0291056 A1* | 10/2013 | Gaudet | H04W 12/06 726/1 |
| 2013/0347089 A1* | 12/2013 | Bailey | H04L 63/18 726/7 |
| 2015/0378842 A1 | 12/2015 | Tomlinson et al. | |
| 2016/0125412 A1 | 5/2016 | Cannon | |
| 2016/0337344 A1* | 11/2016 | Johansson | H04L 63/0281 |
| 2016/0359838 A1 | 12/2016 | Dasgupta et al. | |
| 2017/0054756 A1* | 2/2017 | Jones | H04L 67/52 |
| 2017/0118025 A1* | 4/2017 | Shastri | H04L 9/00 |
| 2017/0142579 A1 | 5/2017 | Gaudet et al. | |
| 2017/0264430 A1* | 9/2017 | Robertson | H04L 9/0869 |
| 2017/0366556 A1* | 12/2017 | Pemmaraju | H04L 9/3215 |
| 2019/0036934 A1* | 1/2019 | Pitchaimani | H04W 12/37 |
| 2019/0268165 A1 | 1/2019 | Monica et al. | |
| 2019/0058700 A1* | 2/2019 | Kurian | H04W 12/065 |
| 2019/0068563 A1* | 2/2019 | Kurian | H04L 9/3231 |
| 2019/0079504 A1* | 3/2019 | Wu | G06F 3/0482 |
| 2019/0147152 A1* | 5/2019 | Kurian | G06F 21/32 382/118 |
| 2019/0173853 A1 | 6/2019 | Hasek et al. | |
| 2019/0266576 A1* | 8/2019 | McCauley | G06Q 20/065 |
| 2019/0268342 A1* | 8/2019 | Rossman | G06F 21/40 |
| 2019/0312858 A1* | 10/2019 | Johansson | G06F 21/45 |
| 2020/0066072 A1* | 2/2020 | Galvez | H04L 9/3239 |
| 2020/0196145 A1 | 6/2020 | Gaudet et al. | |
| 2021/0409217 A1* | 12/2021 | Maley | H04L 63/123 |
| 2021/0409945 A1* | 12/2021 | Gaudet | H04W 12/04 |
| 2022/0166605 A1 | 5/2022 | Suurkivi et al. | |
| 2022/0198043 A1* | 6/2022 | Kozlowski | G06F 9/5072 |
| 2022/0200990 A1* | 6/2022 | Madej | H04L 63/0807 |
| 2022/0231861 A1* | 7/2022 | Maley | H04W 4/70 |
| 2023/0328106 A1* | 10/2023 | Johnson | H04L 63/0428 726/1 |
| 2023/0328107 A1* | 10/2023 | Johnson | H04L 63/20 726/1 |

\* cited by examiner

50

QUORUM-BASED AUTHORIZATION TO SECURE SENSITIVE CLOUD ASSETS

TECHNICAL FIELD

The present invention relates generally to secure management of data assets, including configuration of data services, and more particularly, to security, identity and access management of cloud services, and more specifically, to remote "multi-user" authentication and authorization.

BACKGROUND

Cloud migration is when a company moves some or all of its data center capabilities into the cloud, usually to run on a cloud-based infrastructure provided by a cloud service provider. Many data centers are migrating, or have already migrated, to the cloud, whereby service providers offer leverage on services, for example: Software as a Service (SaaS), Platform as a Service (PaaS), or Infrastructure as a Service (IaaS). Typically, an identity and access management service allows operations to manage their infrastructure and provide fine-grained access and authorizations to different administrators and users. Although cloud providers offer extensive configuration flexibility, security and remote access administration are a challenge to infrastructure management as compared to physical data centers.

Cloud Service offers a variety of Multi-Factor Authentication (MFA) factors, which are pieces of information and a process used to authenticate a person's identity for security purposes. Two-factor authentication is an authentication mechanism based on two pieces of information: something one has, such as a smart card, token ID, etc. and something one knows, such as a PIN. When presented with a log-on option, the user must provide both pieces of the authentication factor or they are denied access to the system. Cloud applications may even employ multi-factor authentication (MFA) as a security measure whereby a user is granted access to a website or application only after successfully presenting certain pieces of evidence to an authentication mechanism. MFA is not unique to the large cloud providers, or other public clouds, and even on-premise data centers benefit from multi-factor authentication.

Although cloud providers are enhancing their individual user accounts through software or hardware MFA, they do not necessarily address problems where multiple users must be authenticated together.

SUMMARY

In one embodiment, a system is provided to authenticate multiple users in order to secure sensitive cloud assets. The system comprises a resource, an identify provider, a service provider and a user device. Access to the resource and the data requires multi-user authentication from multiple authorizers. The service provider is communicatively coupled to the device and resource and provides services for the producing and consuming. The identify provider is communicatively coupled to the service provider to authenticate and authorize the multiple authorizors for providing the access. The user device executes a device app that, in response to a notification of a user requesting access to the resource or the data, determines whether a quorum approval is met in order to grant temporary access. The device app authenticates the user and multiple authorizors, polls votes from the multiple authorizors and determines when a quorum approval for utilizing the data is met within a constraint. If so, the system authorizes the user with temporary access to the data for use by one of the services if the quorum approval satisfies a constraint. The system further enforces temporal and physical conditions on the temporary access to the resource. The resource may be one among a secure console, a Key Management System (KMS) including but not limited to Bring Your Own Key (BYOK) or Hold Your Own Key (HYOK), a Hardware Server Module (HSM), or another secure device.

The constraint may be a temporal constraint and/or a physical constraint. Enforcement may be performed by system components, either alone or in combination. As one example, the resource itself may include an enforcement module configurable via an API to check access rights. Accordingly, in another arrangement, the enforcement by way of the API may be issued through the service provider or the identify provider. The temporal constraint may be a time window having a fixed start point and either an end point or duration. The physical constraint may be based on a geographic point at a precise location on the earth or within a configurable radius from a precise location on earth. A quorum approval is achieved when a predetermined number of authorizors have been authenticated and have authorized access to the data, service or resource requested by the user, or responsive to the notification in accordance with the temporal constraint and/or physical constraint. The authorizors may be informed of the user request, and grant access and authorization, via a push action or a pull notification from the device app.

The system is further configurable to provide a secure computing environment with controlled ingress and egress of artifacts. In this configuration, it may further include a bridge device communicatively coupled to an in-band network and an out-of-band network connected to the resource that transfers the data there between; and a process daemon that is configurable via the device app and controls an air-gapped switching of the data between the secure in-band network and the out-of-band network responsive to the quorum approval. In one arrangement, the bridge device is configurable via a back-end cloud integration RESTful quorum API offered by the service provider. In another, the bridge device interchangeably couples the app to either of the in-band resource or the out-of-band resource indirectly via TCP/IP connection.

In another embodiment, a method is provided for authenticating multiple users to secure sensitive cloud assets. By way of a device app executing on a user device, in response to a user requesting access to a resource or data within a computing environment, performs the steps of: authenticating the user requesting access to a resource producing or consuming data within the computing environment, wherein access to the resource and the data requires multi-user authentication from multiple authorizors; and, authorizing the user temporary access to the data for use by a service within the computing environment upon determining a quorum approval in accordance with temporal and physical conditions. The device app authenticates the user and the multiple authorizors, polls votes from the multiple authorizors to determine when the quorum approval for utilizing the data is met within a constraint; and enforces temporal and physical conditions on the temporary access to the resource. The enforcement ensures that the user access to the resources and data does not exceed the scope of the authorization granted by the quorum approval.

The method includes notifying, by way of the device app, the authorizors that a request for using a resource or accessing data is pending, and confirming a vote via a push action or a pull notification responsive to the notifying in accordance with the temporal constraint and the physical constraint. The method provides for controlled ingress and egress of artifacts within the computing environment, by way of a bridge device and a process daemon. The bridge device is communicatively coupled to an in-band network and an out-of-band network connected to the resource that transfers the data there between. The process daemon is configurable via the device app to control an air-gapped switching of the data between the secure in-band network and the out-of-band network responsive to the quorum approval.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Protecting computer systems and sensitive information from attackers traditionally involves the use of authentication, firewalls and other components to restrict who can access a secured computing resource. One solution to protect a compute resource is to make it physically inaccessible. But, this means someone usually needs to be present in front of the resource to operate it since it is not connected. Herein provided is a solution that provides for quorum authentication to access sensitive cloud assets, and in further embodiments, creates an air-gap to the computing resource to make it physically inaccessible, without the need for physical presence, yet remotely accessible. An air-gap is a network security measure employed on one or more computers to ensure that a secure computer network is physically isolated from unsecured networks, such as the public internet or an unsecured local area network. An air-gap usually severs electrical connections between components on the network.

Figure 1A:
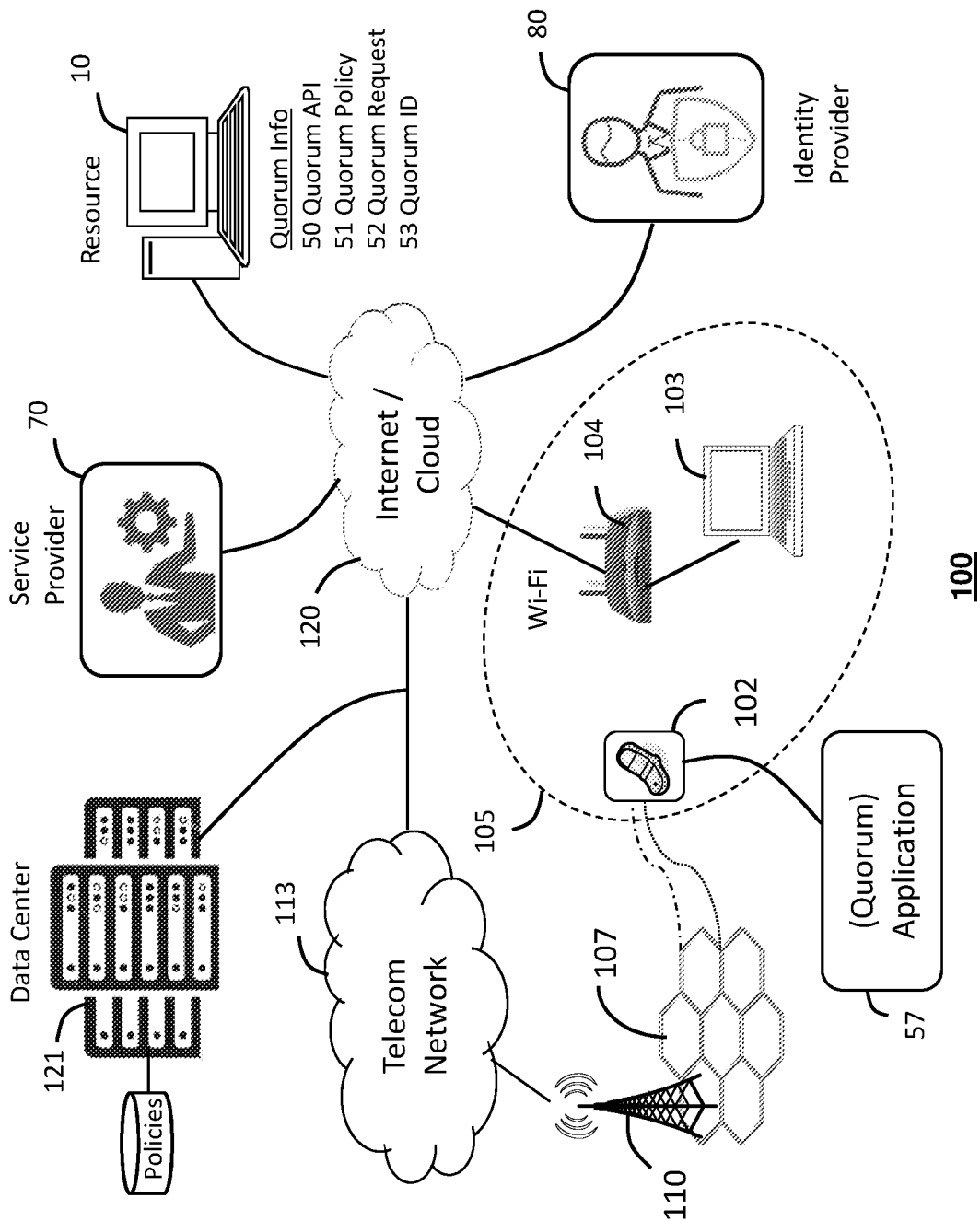
FIG. 1A depicts an exemplary communication environment for configuring an HSM via an application in accordance with one embodiment.

FIG. 1A depicts an exemplary communication environment 100 for configuring a resource 10 via an application (app) 57 in accordance with one embodiment. The application 57 is a multi-user authenticator app that implements a quorum-based policy decision metric. From the user's viewpoint, it is the entry point for managing secure access to assets/resources in the communication environment 100, and those that service data to and from the resource 10. Such assets/resources may be within the data center 121, in the cloud 120, or offered by the Service Provider 70. By way of the Service Provider 70 and Identify Provider 80, the app 57 provides multiple factor authentication (MFA), secure one-time passcode (OTP) generation, as well as single-tap push or pull authentication. It runs on a device, for example, mobile device 102, laptop 103 or any other connected device, and is communicatively coupled to components and network devices in the communication environment 100.

The cloud service provider 70 is a third-party entity that offers a cloud-based platform, infrastructure, application, and storage services (e.g. PasS, SasS, IasS). It hosts resource services via the resource 10 and to those in the data center 121. Accordingly, the service provider 70 provides on-demand availability of computer system resources including data storage, computing power, and cryptographic services without direct oversight and management by the user. It can delegate to other services for enhanced trust, for example, Identity Provider 80 for authentication, authorization, attestation, attribute provisioning, credentials, certificate authority, trust, and cryptography.

The Identity Provider 80 (IdP) is a service that creates, stores and manages digital identities. It provides the user or their internet-connected device (e.g. 102/103) authentication with a single set of login credentials. This ensures to other entities that the user is who they claim to be; it supports assertion message types: authentication, attribution and authorization. The Identity Provider 80 can communicate with other entities and other web service providers via Security Assertion Markup Language (SAML) or data formats like Open Authorization (Oauth2). Oath2 allows users to grant websites or applications access to their information on other websites but without giving them the passwords. Here, the Identity Provider 80 authenticates the administrators using the app 57. Responsive to receiving a quorum request, each administrative user (or authorizor) can individually authenticate with the Identity Provider 80, and thereafter, via service provider 70, grant or deny data access and remote configuration to the resource 10.

The communication environment 100 can include a telecommunication network 113 and an internet communication network (internet) 120. The telecommunication network 113 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or LTE 4G and 5G. The base receiver 110, in turn, can connect the mobile device 102 to the internet 120 over a packet switched link. The internet can support application services and application service layers 150 to provide media or content to the mobile device 102. By way of the communication environment 100, the mobile device 102 can establish connections with a service provider 80 on the network and with other mobile devices to exchange information or to provide services such as audio, text messaging, media, audio, video, interactive applications, and the like. The service provider 80 can have access to a database that is stored locally or remotely and which can contain profile data. It can also host application services directly, or over the internet 120.

The mobile device 102 can also connect to the internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. The mobile device 102 can send and receive data to the service provider 80 or other remote servers on the mobile communication environment. In one example, the mobile device 102 can send and receive audio, video, or other multimedia content from the database through the service provider 80.

Figure 1B:
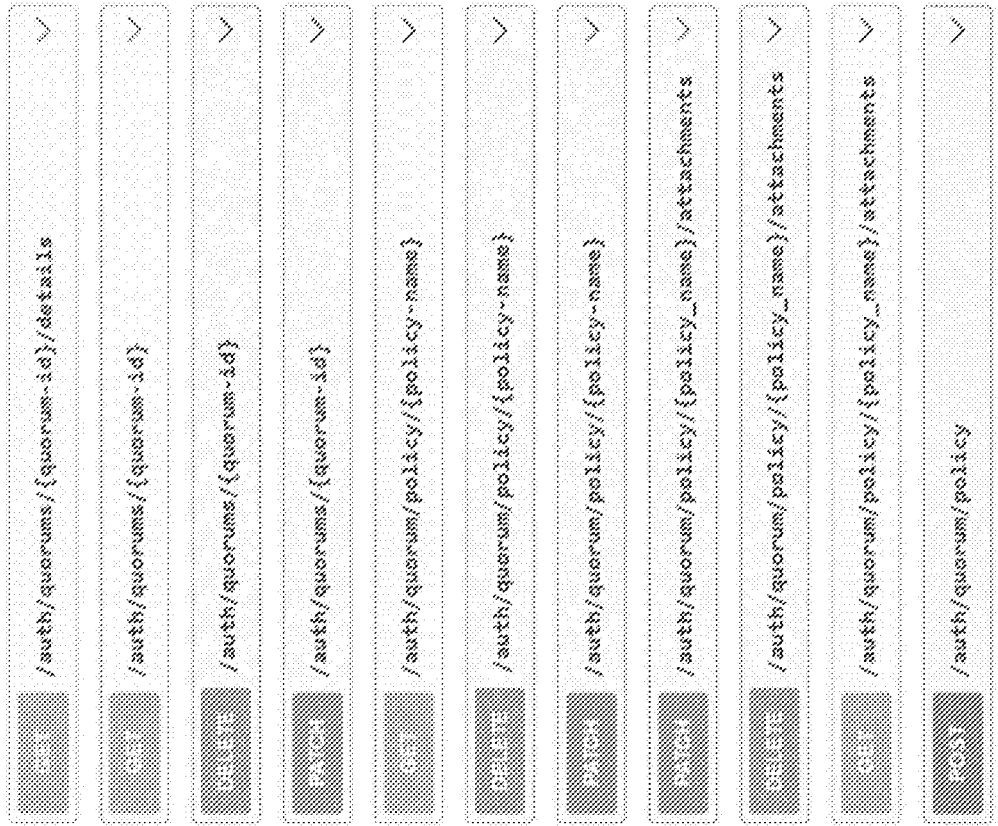
FIG. 1B depicts an exemplary quorum authorization API implemented on an HSM in accordance with one embodiment.

FIG. 1B depicts an exemplary quorum authorization API 50. An "Application Programming Interface" (API) is an entity that allows two systems to communicate with one another. Here, the API is implemented on the resource 10. An API essentially provides the language and contract for how two systems interact. APIs work using 'requests' and 'responses.' When an API requests information from a web application or web server, it receives a response. The place that APIs send requests and where the resource live is called an endpoint. An endpoint is one end of a communication channel. When an API interacts with another system, the touchpoints of this communication are considered endpoints. For APIs, an endpoint can include a URL of a server or service. Each endpoint is the location from which APIs can access the resources they need to carry out their function.

The resource 10 includes a quorum Application Programming Interface (API) 50 which allows the user to configure and manage the resource 10 in accordance with a quorum policy 51. The API implementation enables quorum authorization services on the resource. The resource may also reside in the networked data center 121 for providing cloud-based services. In either case, a third party can request configuration controls to the resource 10 by way of the application 57, for instance, to service it for client data protection, encryption services or other cryptographic operations. In one use-case scenario example, three or more administrative users of the resource, by way of their communication device (e.g., 103, 102) using the app 57, can together authorize a request to access data on the resource 10 or perform cryptographic operations thereon. Temporary access to the user, or on the resources and/or data, can be limited and enforced by temporal and physical conditions (e.g. user can only access the resource during a specific time or at a specific location).

In one embodiment, the quorum authorization API 50 is a RESTful API exposed by the resource 10. RESTful is an architectural style for an application program interface (API) that uses HTTP requests to access and use data. That data can be used to GET, PUT, POST, PATCH and DELETE command types, which refers to the creating, reading, updating, and deleting of operations concerning resources. GET requests are used to retrieve data, and POST requests are used to create data (related to quorum and resources; also, to produce and consume the quorum services and data) with the REST API. REST is a logical choice for building APIs that allow users to connect to, manage and interact with cloud services flexibly in a distributed environment, and allows cloud consumers to expose and organize access to resource-based web services. The API may include more components/modules than those shown, and merely provides an example of the API type. In accordance with RESTful practice, there are RESTful methods for producing and consuming data per FIG. 1A: quorum policy 51, quorum request 52, quorum ID 53, etc., related to name, policy and data attachments.

Figure 2A:
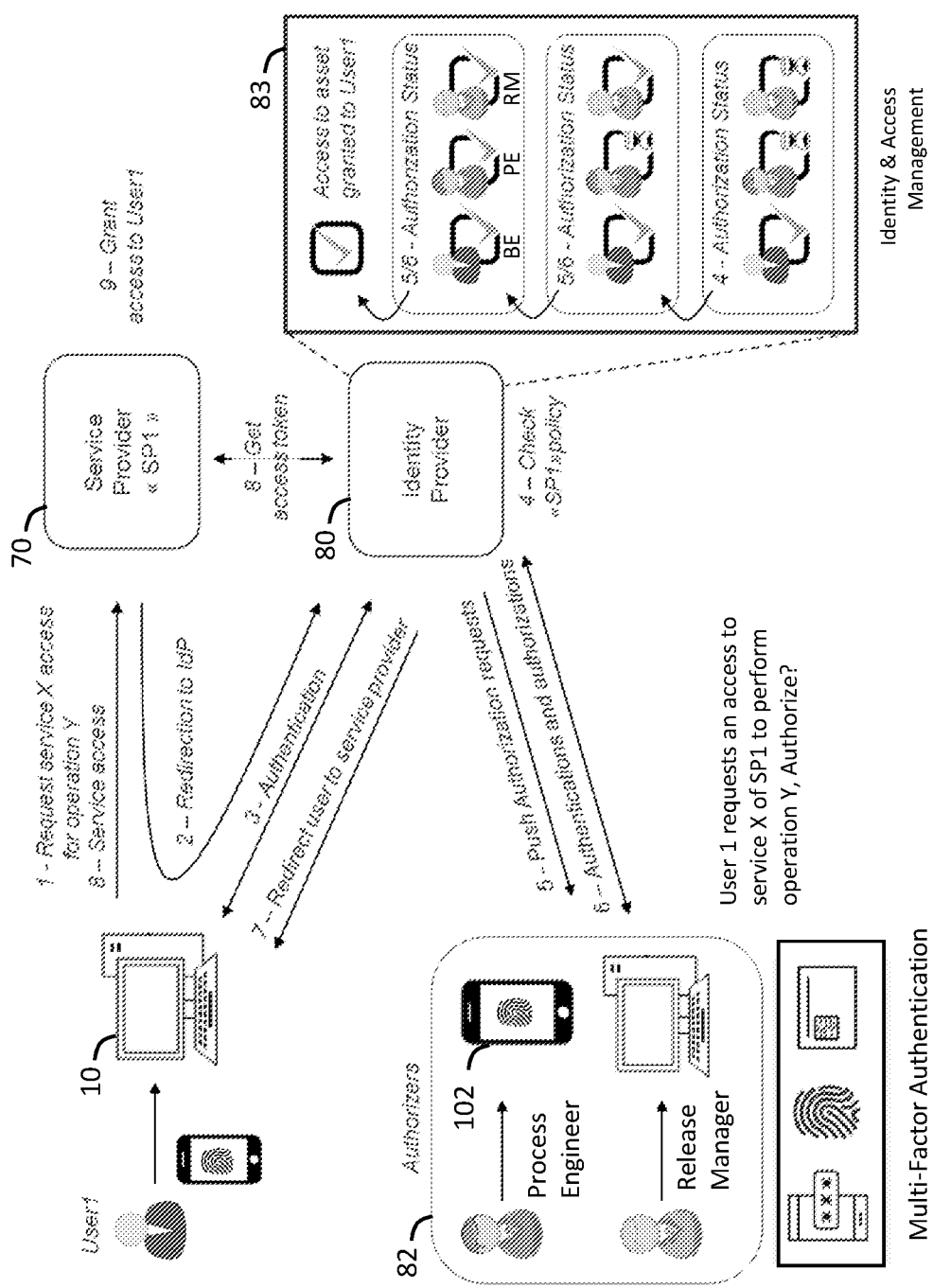
FIG. 2A depicts an exemplary workflow for requesting access to sensitive resources and assets in the communication environment of FIG. 1A in accordance with an embodiment.

In another embodiment, the quorum authorization API 50 is a gRPC API exposed by the resource 10. gRPC is based on the Remote Procedure Call (RPC) model, in which the addressable entities are procedures, and the data is hidden behind the procedures. RPC uses HTTP/2 underneath, but HTTP is not exposed to the API designer. gRPC is a technology for implementing RPC APIs that uses HTTP 2.0 as its underlying transport protocol. It enables client and server applications to communicate transparently, and makes it easier to build connected systems. gRPC-generated stubs and skeletons hide HTTP from the client and server too, so nobody has to worry how the RPC concepts are mapped to HTTP FIG. 2A depicts an exemplary workflow 200 for requesting access to sensitive resources and assets in the communication environment (see 100 of FIG. 1). Access is provided by way of a trusted platform stored in the cloud that strengthens the security of those sensitive resources and assets stored in a cloud infrastructure. The trusted platform is one embodiment of the invention and provides enablement for the workflow 200. Textual steps 1-8 shown are referenced and discussed next in FIG. 2B.

In this example, the platform (see components in FIG. 1) comprises the device 102, application 57, the service provider 70, the identify provider 80, and the resource 10; all communicatively coupled. The user is a person needing to access one or multiple assets of the service provider infrastructure, for example, an individual on an operational team in the data center 121 (FIG. 1A). The example user context for workflow 200 is a build engineer from operations who needs to make a maintenance operation on the resource 10, stored in the cloud, and to do so without any physical access to it. In this example, a security policy has been defined for this asset, which enforces it to have at least two authorized people ("authorizors") give their consent to allow access to the resource 10. The security policy is a file/document that states how an entity plans to protect its physical and information technology (IT) assets. It also sets enforcement for conditions on using the resources/data. It identifies the rules and procedures for all individuals accessing and using the organization's IT assets and resources. As a simple example, it may include a list of user names identifying which assets they may access, what privilege levels exist, and how and when they may be accessed by the user. In another example, it may define access rights and privileges by roles or circumstances.

The authorizors 82 are those people giving their approval for the user to access the service provider assets. Depending on the sensitivity of the asset, one or multiple authorizors may be involved. Authorizors are trusted people, for example, security officers with ID cards who can grant the access to a sensitive asset but without being themselves allowed to access it. The authorizors grant their approval by way of the quorum app 57 (FIG. 1A) on the mobile device 102. In one arrangement, the app 57 receives a push notification from the Identity Provider 80 when the user (e.g. build engineer) requests authentication and authorization to the resource 10. For example, "User U1 has been authenticated using his corporate badge and requests an access to the asset X1 of service provider SP1". In another arrangement, for heightened security protocols, the mobile device 102 by way of the app 57 may instead pull for notifications regarding user access to assets/resources (e.g. resource 10).

In this example, the service provider 70 is a cloud entity which manages an infrastructure hosting applications and sensitive assets. It provides its own access and identity management to identify and authorize people to access infrastructure components. It provides as well an option to delegate the authentication and authorization to a trusted identity provider (or IdP) using well-known protocols such as SAML or OpenID Connect. The delegation of the authentication and authorization is the preferred mode in the invention so the invention can be implemented without any impact on the cloud provider.

The Identity Provider (IdP) 80 is a trusted entity responsible for a number of actions. It authenticates the user and authorizors with support of multi-factor authentication (via software or hardware). Multi-factor authentication is a layered approach to securing data and applications where a system requires a user to present a combination of two or more credentials to verify a user's identity for login. Credentials include a password (or PIN), a biometric factor (e.g. fingerprint), or a hardware security device (e.g. Fast IDentity Online USB device), as shown. The Identify Provider (IdP) 80 pushes authorization requests from a user attempting to access an asset/resource to authorizors 82 on their preferred device (e.g mobile phone 102, laptop 103, tablet, computer, etc.). It also provides pull notification services. Several devices may be combined in the authentication process to manage out-of-band authentications. It manages authorizations from authorizors, and manages authentication policies for the different assets/resources. For example, "access to asset X1 is granted to any authenticated user with role Y1." As another example, "access to asset X2 is granted to any user with role Y2 authenticated with at least two form factors if and only if authorizors A1 and A2 gives their consent."

Figure 2B:
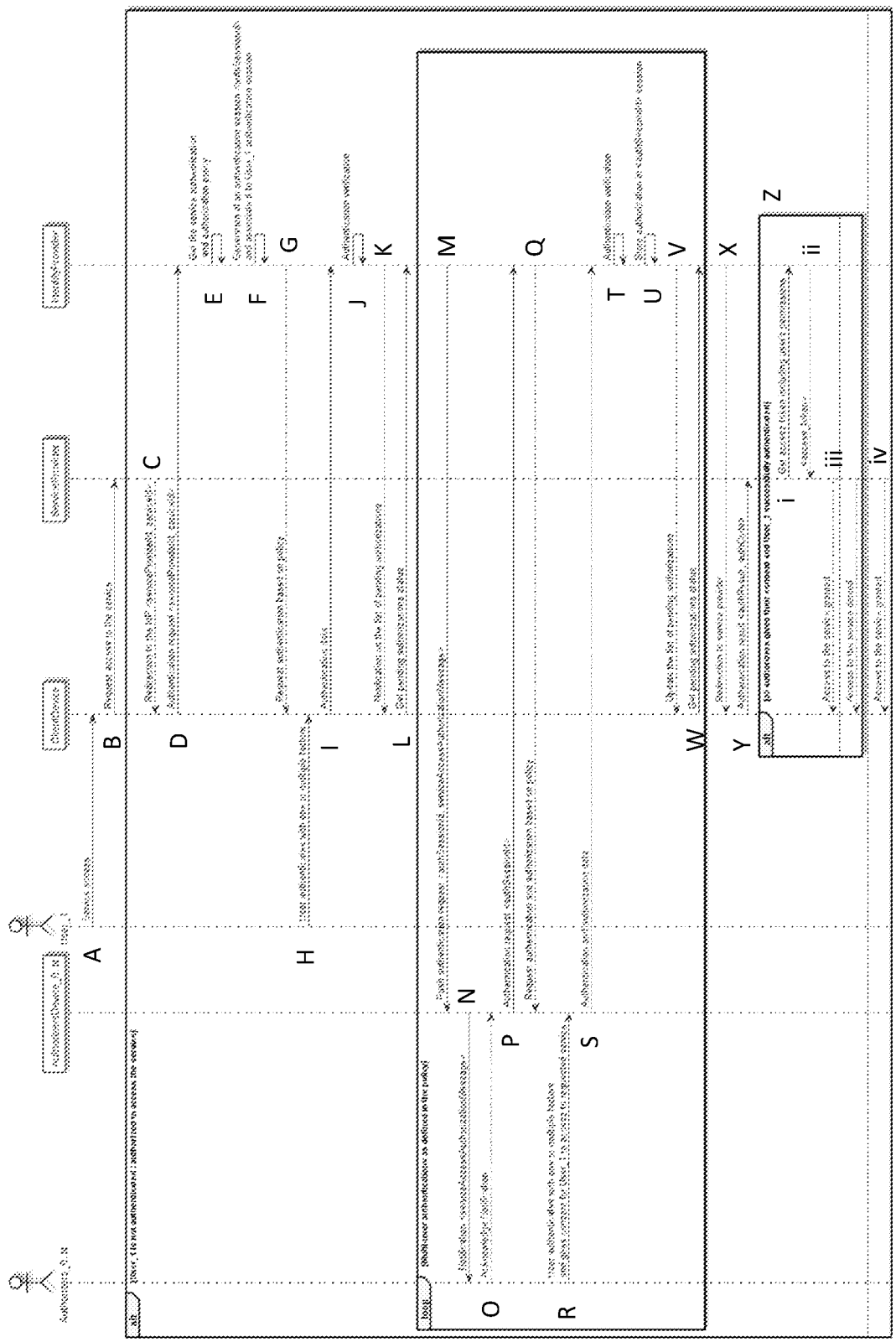
FIG. 2B depicts a sequence diagram corresponding in part to the exemplary workflow of FIG. 2A.

FIG. 2B depicts a sequence diagram 250 corresponding in part to the exemplary workflow 200 of FIG. 2A. Reference will be made to FIG. 2A when describing the steps of diagram 250 in FIG. 2B, since certain steps of the sequence diagram correlate with certain steps 1-8 of the work flow 200. More or less than the number of steps shown may occur in real practice.

In step 1 of workflow 200, the user requests service X (e.g., resource 10) access for operation Y (e.g., sign a file). This corresponds to steps A-B of diagram 250, where the user requests access to a service from the service provider 70. The request may originate from the user's device 102, and/or the device (e.g. resource 10) the user desires access to, if so configured. In step 2 of workflow 200, the user is redirected to identification services for providing identification, which forms part of the authentication process. This corresponds to steps C-D of diagram 250, where the service provider 70 redirects the user to the Identify (ID) provider 80. In step 3 of workflow 200, the user is then required to authenticate, which corresponds to step D of diagram 250. In one arrangement, the resource 10 may be communicatively coupled to the Identity (ID) Provider 80, and configured to authenticate the user via direct input into the resource. In another arrangement, the user may have their own mobile device with app 57 in communication with the identity provider 80 to authenticate to same. Alternatively, both mobile device 102 and resource 10 may have been pre-registered for dual (and mutual) authentication purposes.

In either arrangement, in order to authenticate, the ID Provider 80 checks the service provider policy at step 4. This correspond to steps E-G of diagram 250, where the Identity Provider 80 gets (step E) the service authentication and authorization policy, generates (step F) an authentication session and associates it to the user authentication request, and the requests (step G) authentication based on the policy. Upon receiving the request, the app 57 (and/or resource 10) next requires the user to submit a credential, for example, via MFA (e.g., password, fingerprint, ID card) on their app 57, or direct entry into the resource 10. This corresponds to step H of diagram 250, where the user supplies one or more credentials in accordance with MFA to authenticate to the identity provider 80. The app 57 (and/or resource 10) transfers the authentication information (credentials) to the Identity Provider 80 at step I, which then verifies the credentials at step J, and provides notification at step K on a list of pending authorizations to the mobile device 102 (and/or resource 10). At step L in diagram 200, the app 57 (and/or resource 10) retrieves pending authorization status.

In step 5 of workflow 200, the Identity Provider 80 pushes the authorization requests to the authorizors 82. Once received, the app 57 for each authorizor may pop up and show a notification, for example, "User 1 requests an access to service X of SP1 to perform operation Y, Authorize?" Next, the authorizors are required themselves to authenticate and provide authorization for handling the request as shown in step 6 of workflow 200. These two steps correspond to the loop comprising steps M-V in diagram 250, wherein the ID provider 80 pushes (step M) the authentication request to the authorizor's device 102, thereby notifying (step N) the authorizors, and then requesting (step O) acknowledgement of the push notification. At step P, the authorizor's device sends their authentication request to the ID provider 80, and at step Q, the ID provider 80 requests authentication and authorization based on policy. This step is similar to the request for user authentication at step G, but additionally requires an authorization from the authorizors 82. Each of the authorizor's devices by way of the app 57 presents the authorizor an authentication requirement and authorization request, for example as seen in box 83 of FIG. 2A. At step R in diagram 250, the authorizor is required to authenticate using one or multiple factors, and to provide consent for the user to access the requested service (e.g. file signing) on the selected resource (e.g. resource 10). At step S, the device 102 sends the data authentication (e.g. MFA credentials) and authorization (service X on resource Y) information to the ID provider 80, which then verifies the authentication at step T and stores it for the authentication session for the resource use at step U. At step V, ID provider 80 updates the list of pending authorizations, to which the user's client device 102 gets pending authorization status at step W.

Once all authorizors have been authenticated and provided authorization, the user receives a notification either on their device 102 via app 57, and/or the resource 10 if so configured. This is seen in step 7 of workflow 200 of FIG. 2A, where the ID provider 80 redirects the user to the service provider. This corresponds to steps X and Y in diagram 250 where the ID provider 80 redirects the device 102 to service provider 70, wherein the device 102 sends the authentication result (e.g. authResult, authCode) to the Service Provider 70. If all authorizers approve and the user was successfully authenticated, the service provider 70 gets an access token from the ID provider 80 at step 8 in workflow 200. This corresponds to i-iv) in step Z of diagram 250, where, ID Provider 80 then responds with an access token that is provided to the Service Provider 70 that is then passed to the user's device 102 (and/or resource 10). In the last step 9, the user is notified whether access to the service was granted or denied, and then access to the resource providing the service is provided accordingly.

Workflow 200 and diagram 250 illustrate a scenario wherein all authorizers are required to authenticate and approve access to the service/resource requested by the user. However, as contemplated and described herein, one embodiment of the invention is directed to a quorum manager for establishing access rights according to a policy whereby not all authorizers are required to approve access, but rather, a quorum is required for approval. One advantage is that more than the minimum number of approvers may be invited so that approval is based on an established quorum. The quorum policy may be a M of N approach, whereby so long as M of N authorizers approve, access is granted. Or, because of the widened invitation base, another policy may dictate that any 1 over M authorizers that decline nullify a quorum.

In one embodiment the resource 10 is a Hardware Security Module (HSM), which are often stored in a data center. Data centers must protect against physical threats to its components. Physical security controls include a secure location, the facility physical access controls, and monitoring systems to keep a data center secure. Data center infrastructures require a thorough zero trust analysis incorporated into its data center design. Physical and logical security is managed by segmenting applications into different security zones depending on security needs (example: demilitarized zone, security level 1, 2 or 3). But increased zone security usually results in more security constraints for access management. For example, access to a security level 3 zone requires a minimum of two people presenting their authentication credentials, called dual control processes. Another example is a key ceremony process on an HSM that involves three different people owning each a part of key, for instance, where the key is split into three pieces. With such a process, the key ceremony proceeds only if those three people with their key portions are physically present and performing sequential actions one after each other.

As an example, an HSM manufacturing policy may require that code is securely signed in a secure area for creating an official code release (manufacturing, warranting, production or update) for an HSM, which requires a minimum number of operators (security officers holding the key splits) at different places to physically come together at an agreed upon time to conduct in what is called the signing ceremony. One problem with the signing ceremony is that one of the operators has to manually copy/paste the required artifacts to be signed in the ceremony onto a USB storage device from a public network, and then bring that USB storage device with them into the secure area and insert it into the signing server available only on the private network. The public network upon which the artifacts are made available through CICD/DevOPS must be isolated (for security reasons) from the private network hosting the signing computer that has access to the private keys. CI/CD or CICD is the combined practices of continuous integration and continuous delivery or continuous deployment. CI/CD bridges the gaps between development and operation activities and teams by enforcing automation in building, testing and deployment of applications.

This current approach of using a USB storage device as the data transport mechanism primarily relies on human interactions and dependencies, and that understandably has its own limitations, security concerns and inefficiencies. Other problems (as other examples) are when signed code needs to be installed on the HSM; similarly, that code needs to be copied onto and off a USB storage device in the secure manufacturing zone. A more efficient solution, as provided by the inventive embodiments herein, has centered on how to achieve better control over crypto material access/usage and auditing/reporting of the signing ceremony and, as importantly, how to leverage automations and tools that are already available within the existing Continuous Integration Continuous Development (CICD), Dev-Ops and Release-On-Demand Agile tools.

Figure 3A:
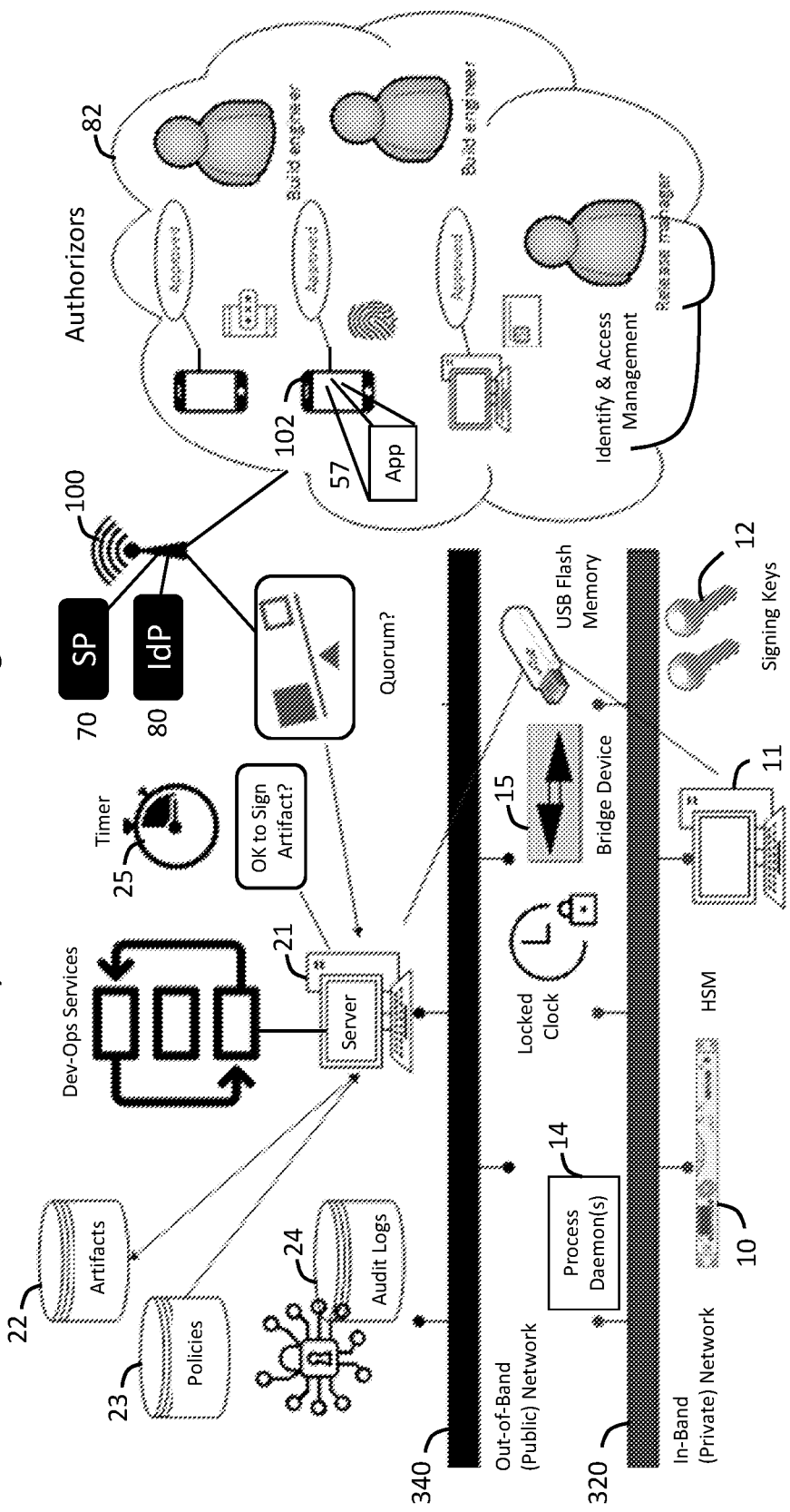
FIG. 3A depicts a system for autonomous, real-time, quorum-based authentication and authorization for air-gapped switching in accordance with an embodiment.

FIG. 3A depicts a system 300 for autonomous, real-time, quorum-based authentication and authorization for air-gapped switching of data between an out-of-band network and a secure in-band network. The system 300 may include more or less than the number of components shown and is not limited to only those shown for enablement. It comprises the user device 102 executing the application 57, the bridge device 15, and a process daemon 14 on the secure in-band network. The workflow of system 300 is analogous to that of workflow 200 shown in FIG. 2A, but extended for quorum-based authentication and enabled via the bridge device 15 and process daemon(s) 14. The system 300 provides a secure computing environment with controlled ingress and egress of artifacts. It increases security, increases flexibility, decreases costs and decreases wait times.

The example context here is a code signing ceremony and build warranting process whereby a manufacturing engineer requires a signed build image to be installed on the HSM (secure resource in the in-band network). The signed image (data; also an artifact) needs to be transferred from a server on an open network to a secure resource on an closed network, then signed as part of a code signing ceremony bringing together multiple security officers with key splits to sign the build image as part of a quorum-approved warranting process, and then transfer the signed image from the secure resource back to the server. That is, in one embodiment, the resource is an HSM comprising a quorum web service Applications Programming Interface (API) to enforce quorum policy and handle quorum requests related to the quorum approval. The process daemon 14 by way of the bridge device 15 transfers an image from a dev-ops platform to an HSM responsive to the device app receiving the quorum approval for the user performing a code signing ceremony. The HSM securely signs the image using private keys thereon to produce a signed image during the code signing ceremony, and thereafter, the process daemon 14 by way of the bridge device 15 transfers the signed image from the HSM back to the dev-ops platform. The out-of-band resource is a build server containing code, artifacts, audit logs and configuration files, and providing the image that is the data, and the out-of-band services on the out-of-band network is the dev-ops platform sourcing the image; and the in-band resource is the HSM hosting the code signing ceremony, and the in-band services on the secure in-band network is the code signing ceremony.

The in-band network 320 provides one or more in-bound resources to provide one or more in-band services producing or consuming data. The out-of-band network may be one of a public network, a public Wi-Fi or external network. Here, the HSM 10 and the warranting server 11 are on the in-band network. The HSM 10 has its own set of internal private keys for signing data/images/files. The warranting server 11 has its own set of keys for signing data/images/files, for example, to produce a warranting image.

The out-of-band network 340 provides one or more out-of-bound resources thereto connected each providing one or more out-of-band services producing or consuming data. The out-of-band network may be one of a private network, a corporate network, a closed Wi-Fi, an internal network, or enterprise infrastructure. Here, the CICD/DevOPs server 21 is on the out-of-band network. It is communicatively coupled to various devices, services, databases, for example, artifacts 22, policies 23, and audit logs 24. The artifacts may be data or files related to images, for example, scripts, binaries, libraries, or even resources themselves. Artifacts generally refer to the output of a deployed build process. Such a deployment may occur in response to autonomous, real-time, quorum-based authentication and authorization as contemplated herein. The output of the deployment could be a jar, tar or binary file. These artifacts are then deployed onto production servers for creating a production image, for example, an image for a different HSM.

The bridge device 15 is communicatively coupled to both the secure in-band network and the out-of-band network. It transfers data and secures the air-gapped switching by isolating access to only one network at a time. The process daemon 14 is configurable via the app 57 and controls the air-gapped switching of data between the secure in-band network and the out-of-band network responsive to quorum approval when timely established. In response to a notification of a user requesting access to the data for use by one of the in-band services and the out-of-band services, the app 57 authenticates the user and multiple authorizors, polls votes from the multiple authorizors and determines when a quorum approval for utilizing the data is met within a temporal constraint, and authorizes the user temporary access to the data for use by one of the in-bound services and out-bound services upon quorum approval. The app can identify whether a user is also one of the multiple authorizors, which may also count as a vote depending on the policy.

The Hardware Security Module (HSM) is a dedicated crypto processing unit that is specifically designed for the hardware protection of the crypto key lifecycle. Hardware security modules act as trust anchors that protect the cryptographic infrastructure of some of the most security-conscious organizations in the world by securely managing, processing, and storing cryptographic keys inside a hardened, tamper-resistant device. Enterprises use hardware security modules to protect transactions, identities, and applications, as HSMs excel at securing cryptographic keys and provisioning encryption, decryption, authentication, and digital signing services for a wide range of applications.

HSMs protect encryption keys and are used by applications in on-premise, virtual, and cloud environments. They are hardware equipment that can be stored in racks in a data center and associated with cryptographic networking components. They are deployed and securely configured remotely in any of these environments. Because they are secure and operate on sensitive data only authorized applications are allowed access. Access to a HSM is usually controlled via a management interface. Authentication is the process of verifying a user's identity and their ability to access a requested account on the HSM. Authorization establishes which permissions the user has within the HSM.

Continuing with the workflow example of FIG. 3A, the process daemon 14 by way of the bridge device 15 transfers an image from a dev-ops platform service to the HSM 10 responsive to the device app 57 receiving a quorum approval for the user to perform a code signing ceremony. The HSM 10 securely signs the image using private keys thereon to produce a signed image during the code signing ceremony. Thereafter, the process daemon 14 by way of the bridge device 15 transfers the signed image from the HSM 10 back to the dev-ops platform. Here, the out-of-band resource is the build server 21 providing the image that is the data, and the out-of-band services on the out-of-band network is the dev-ops platform sourcing the image communicatively coupled to the build server. The in-band resource is the HSM 10 hosting the code signing ceremony, and the in-band services on the secure in-band network is the code signing ceremony.

The quorum approval is established by the quorum policy. As noted above, the quorum threshold may be achieved when a certain (or predetermined) number of authorizors have been authenticated and have authorized access to the data, service or resource requested by the user, or responsive to a notification. The policy may impose role-based access controls, which require certain roles (e.g., build manager, release manager, test engineer, etc.) be fulfilled and that a certain number of votes arrive from these roles. In one arrangement, the policy establishes a temporal constraint on the authorization procedure, whereby authorizes must approve within a predetermined window of time, of sufficient duration only to gather the data and authorize. The constraint is a time window having a fixed start point (e.g. Thursday May 26@5 PM GMT) and either an end point (e.g. Thursday May 27@5 PM GMT) or duration (24 hours). The temporal constraint as defined in the policy may require a registration event whereby a location of the authorizors is determined at the present location (e.g. user presently at GPS DMS: 41°24'12.2"N 2°10'26.5"E), or established in the future (e.g. user expected to be within a 5 mile radius of zip code at scheduled voting time).

The registration event can occur during installation of the application. After the user downloads and installs the app 57, the user may be prompted to register their device; an event which may include its own separate authentication (e.g. via OpenID connect) and authorization (e.g. via Oauth2) activities. The registration indicates where they may be during certain days/times, such that when the push notification comes in, the device must report a location and time window consistent with the policy bounds for the parameters set by the temporal constraint. The registration event may additionally require the setup of a voting PIN or password. The registration event may further include PKI-based confirmations, for example, signing of the vote using a private quorum key, with a paired public quorum key handled by the service provider 70 and/or the app 57 and any intermediate certificate authorities (CA) to establish a chain of trust. In this manner the temporal constraint, along with the user authentication by way of MFA as previously described, is cryptographically secure and binds the voting to a user location and/or time window. This restricts access to the air-gapped network for sensitive transactions.

A pull model for triggering the quorum approval internally is also contemplated whereby the autonomous, sensitive process establishes real-time authorization from a quorum of specific roles to proceed in a short time window. A notification may be sent to the device 102, wherein during the short time window the authorizor is required to connect and pull the latest updates regarding the authorization. Those authorizors that respond within the time constraint are accepted for providing a vote on whether to provide data access/use. Specific roles may include product release manager, build engineer, production engineer, code developer, security officer, test engineer, etc. As example, suppose a process at server 21 requires that within five minutes, authorization is required from two process engineers and one release manager. The timer 25 starts for obtaining authorization quorum from specific roles, no requirement for co-location with the autonomous process. If the quorum is achieved in the prescribed window (e.g. any combination of location, time, and role), the individuals (and their roles) are authenticated and cryptographically attested to, for example, by way of the SP 70 and IdP 80 as earlier noted. In this pull model, quorum authorization is achieved in real-time allowing the process to proceed with all activities thereto related with the quorum approval logged.

A push model for triggering the quorum approval externally is also contemplated whereby an autonomous, sensitive process on server 11 establishes real-time authorization from a quorum of specific roles to proceed in a short time window. Push notification authentication enables user authentication by sending a push notification directly to the secure app 57 on the user's device 102, alerting them that an authentication attempt is taking place. In the push model, an external request is made to perform a process, for example, a process engineer by way of app 57 requests that a process of server 11 be authorized. Once the request has been distributed to the authorizes, for instance, in accordance with workflow 200 supplemented with quorum-based real-time autonomous manager (referencing location by device GPS, and time by timer 25 in view of quorum policy and/or SP 70 policies) a quorum authorization is achieved in real-time and allows the process to proceed with audit logging enabled. As an example, the policy may dictate that authorization must be obtained between time $t_0$-$t_1$, the automated system performs tasks per policies between time $t_1$-$t_2$, or authorization is invalid beyond time $t_2$. The policy may also prescribe which artifacts are used or generated and link access privileges to each based on the approvals.

The quorum policy initially sets the roles, users, authorizors and other data, service, resource use defaults. The app 57 once installed, and for registered users, pulls and filters information from the quorum policy as needed for a registered user with respect to quorum requests, for example, where authorizors are required to vote on data access. The policy also defines whether the push model and/or pull model is used, individually or combined. Where the policy does not provide indication of quorum related activities, the app 57 permits the authorized users to also vote on quorum configurations, for example, the quorum approval and how many votes are required from each role to meet the threshold for permitting data access.

One advantage of the workflow of system 300 is that the HSM does not rely on internal network access protocols. Rather, security objectives are achieved out-of-band via telecom and IT services, for example, over the 5G network. This provides for a secure endpoint inside the in-band network facility, and allows authorizors to reach into the secure facility and perform functions on resources therein. The key criteria offered in this solution provides a way for the secure facility/area to have a network attachment to the enterprise infrastructure (e.g. CICD/DevOps, build servers, HSMs, etc.). Going further with this example, the system 300 in effect implements a continuous pipeline that outputs artifacts (e.g. firmware) for instance, authorizors receive a push notification stating that production image version 1.7 release is ready. The device 102 prompts the authorizor for a yes/no response in the app 57 to sign, and/or release the code; all activities stored in an audit log 24 (e.g. record the response, the version number, the date, the build number, etc.) This occurs simultaneously for all authorizors and each's response on their device and data use information (e.g. manufacturing build, warranting build, production build, etc.) on both networks (in/out band) is recorded and logged. Then, when M of N quorum is achieved (or other quorum metric) from the authorizors the DevOps pipeline is updated and the air-gap is closed to fulfill the requested function/operation, for example, production code signing. Moreover, where the app 57 is installed on the user's device, the organization managing the pipeline is ensured the user is authorized. This is further enforced by way of the SP 70 and IdP 80 even after the secure app 57 is installed on the device 102; namely, the app, user and device are registered during the app installation process.

Figure 3B:
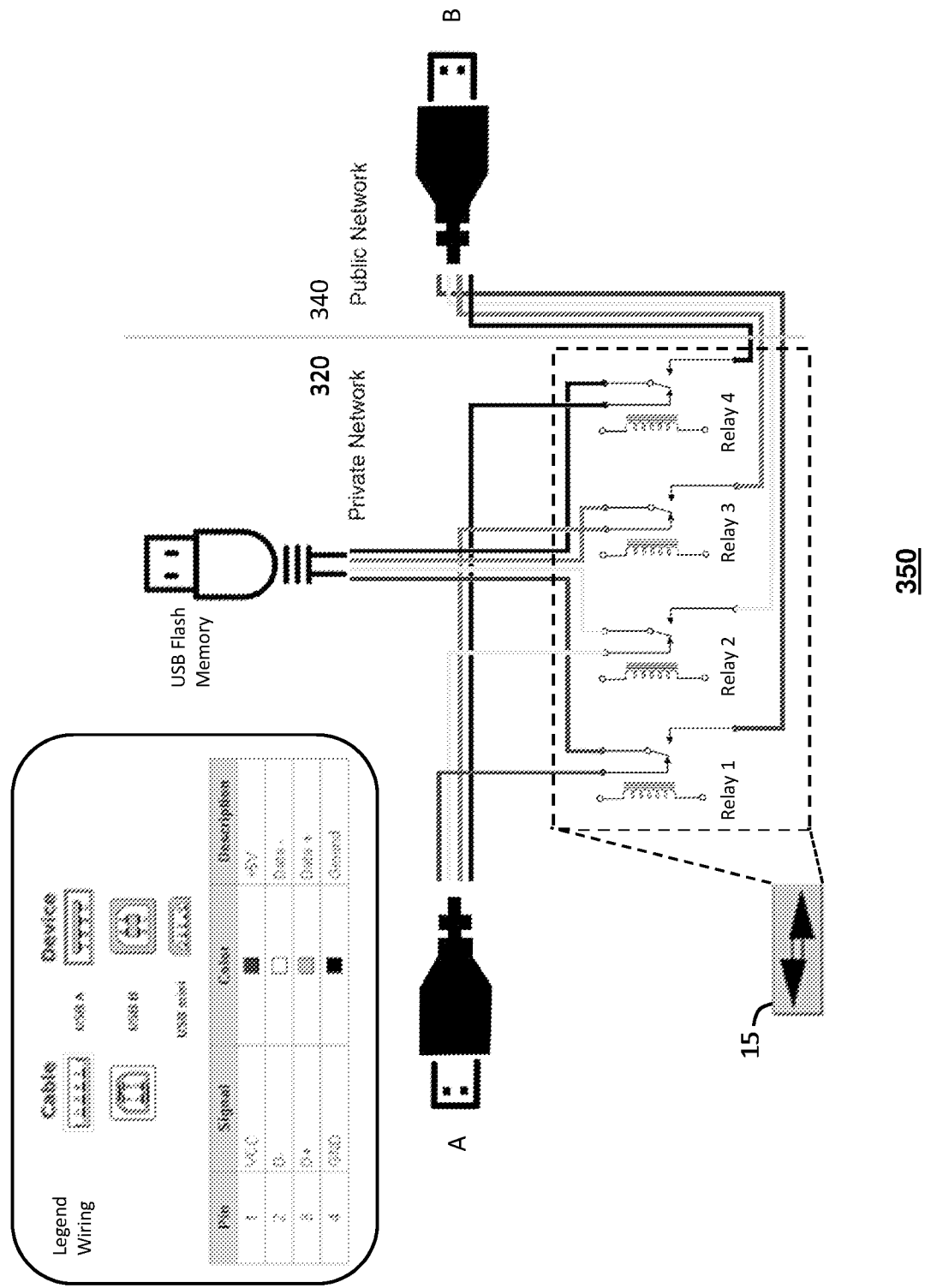
FIG. 3B depicts an exemplary device for a bridge device to ingress and egress artifacts between two distinct, air-gapped networks.

FIG. 3B illustrates a schematic 350 of the bridge device 15 for ingress and egress of artifacts between the private network 320 and public network 340. The bridge device 15 includes multiple relays each connected to a respective USB port A, port B and USB flash memory each exposed as an interface. A legend for the wiring is shown. Applying power to the VCC signal and connecting the ground energizes a device connected to the bus. With this in mind, wiring the USB signals to their common contact points on the relay with different end-points wired to the normally-open and normally-closed contact points, provides a novel way to remotely switch a USB flash device between the public 340 network and the private network 320. This figure shows how to achieve a physical separation between networks with the use of a USB device to ingress to and egress data from the private network. Control of the switching component remains within the private network. When ready to obtain data from the public network, an entity within the private network switches the relays to make the USB flash device appear to a compute resource on the public network. This switching may be achieved in one embodiment by an Ethernet Relay Switching Unit (ERSU). A peer entity within the public network copies data off of the USB flash memory device and copies data destined to the private network onto the device. After a configurable period (e.g. via API 50 of FIG. 1A, or App 57 of FIG. 1A) the entity on the private network switches the relays, by way of the ERSU, to bring the USB drive back to appear as a drive on a compute resource within the private network. Data copied onto the USB device when in the public network is available to be copied onto the compute resource within the private network.

In conjunction with the bridge device 15, for operating the relay switches (R1-R4) are the following components: Process daemon(s) 14 of FIG. 3A which comprise one or both sub-systems of a Work Flow Servicing Daemon (WFSD) running on server 11 and an Autonomous File Transfer Daemon (AFTD) running on server 21 and server 11. The process daemon runs on the secure in-band network that is also indirectly configurable (e.g., SP 70, App 57) and controls the air-gapped switching of the data between the secure in-band network and the out-of-band network responsive to the quorum approval when timely established. The WFSD is responsible for initiating the business logic within the secure computing environment. The WFSD schedules the actions initiated by a received communication (e.g. SMS) or autonomously performs an action built into a business logic of the system. The WFSD adds an action to a queue to be processed by a Remote Action sub-system. The AFTD sub-system waits for an insertion event for the USB flash memory (drive event). Upon detecting device insertion, the AFTD transfers files, if present, off the USB flash drive onto the host system and copies files, if present, from the host system onto the USB flash drive. The Remote Action sub-system also coupled to the process daemon(s) 14, the ERSU and USB, monitors the queue and performs specific actions queued for it. The separation of the WFSD from this sub-system enables the WFSD to serve as a dispatcher, leaving the Remote Action to perform the detailed business logic. The ERSU is responsible for the hardware. It switches the USB flash drive between the private and public networks responsive to process daemon commands, for instance, when the WFSD needs data from the public network or has data to be sent to the public network, the WFSD actions the ERSU. By way of these lower-level components, the USB flash memory device is alternatively bridged between the open public network and the closed private network, thereby allowing resources on each network to mount and use an external drive with data transfer actions physically and securely isolated.

Moreover, by way of integration and interaction of the higher-level components comprising system 300, the autonomous, real-time, quorum-based authorization for bridging an air-gapped network provides tight coupling between person and role, defines a turn-key solution, and enables an autonomous pull model to seek authentication with the system reaching out. Furthermore, it emphasizes a real-time quorum for authorization to proceed by way of temporal constraints to timely establish quorum response and approval. It enables sensitive operations such as those associated with an HSM requiring multi-user control, and ties in policy to decision making, whereby the organization can define policy for who, what, when, where and how. As shown, in one example, the system 300 bridges the air-gapped network with a USB flash memory device, which allow ingress and egress from an air-gapped network. The authentication steps are cryptographically-backed, with high assurance, whereby the user at the resource end of the network is required to prove who they are, and cryptographically attest to their identity, for data access. The system supports for a timely re-authentication, individual authorizations for specific tasks, all the while providing traceability and compliance by capturing and documenting an audit trail.

Figure 4:
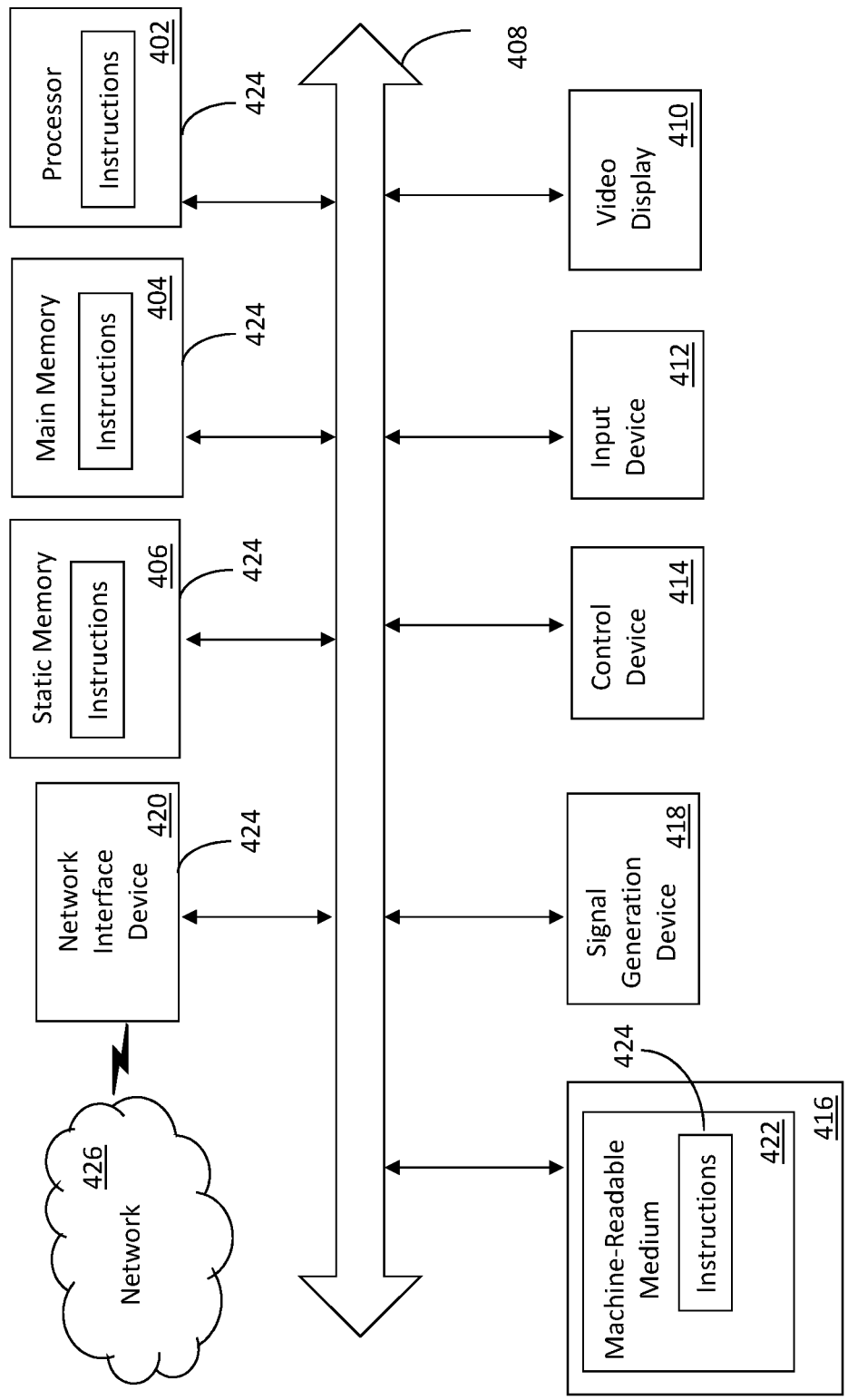
FIG. 4 depicts an exemplary diagrammatic representation of a machine and hardware platform to perform the methods herein in accordance with an embodiment.

FIG. 4 depicts an exemplary diagrammatic representation of a machine 400 and hardware platform suitable for use to perform the methods and steps exemplified above in system 100, workflow 200, sequence diagram 250, and by components of the system 300, in accordance with various embodiments. For example, the method steps of the app 57, HSM 10, and processor daemon(s) 14, can be performed by a hardware processor of the machine 400 executing computer program code instructions (from software) from an electronic memory to execute the method steps. At least one a hardware processor of machine 400 can execute computer program code instructions from an electronic memory to execute processes above.

The machine 400 is shown in the form of a computer system within which a set of instructions, when executed, may cause the machine to perform any one or more of the methodologies discussed above. In some embodiments, the machine operates as a standalone device, such as a computer, laptop, mobile device, remote control, or display. In some embodiments, the machine may be connected over the network to other machines. In a networked deployment, the machine may operate in the capacity of a server or a client user machine in server-client user network environment, or as a peer machine in a peer-to-peer, or distributed, network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display or LCD), a flat panel, a solid state display, or a cathode ray tube (CRT)). The computer system 400 may include an input device 412 (e.g., a keyboard, touchless sensing unit 110), a cursor control device 414 (e.g., a mouse, keyboard), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

What is claimed, is:

1. A system to authenticate multiple users to secure sensitive cloud assets, the system comprising:
   a Hardware Security Module (HSM) that produces or consumes data, wherein access to the HSM and the data requires multi-user authentication from multiple authorizors by way of
   a service provider communicatively coupled to the HSM to provide services for the producing and consuming the data, and
   an identity provider communicatively coupled to the service provider to authenticate and authorize the multiple authorizors for providing the access to the HSM;
   an user device executing a device app that in response to a user requesting access to the HSM or the data:

authenticates the user and multiple authorizors,
polls votes from the multiple authorizors and determines when a quorum approval for utilizing the data is met within a constraint,
authorizes the user with a temporary access to the data for use by one of the services upon the quorum approval in accordance with temporal and physical conditions; and
enforces the temporal conditions and the physical conditions on the temporary access to the HSM;
a bridge device communicatively coupled to an in-band network and an out-of-band network connected to the HSM that transfers data there between; and
a process daemon that is configurable via the device app and controls an air-gapped switching of data between the secure in-band network and the out-of-band network responsive to the quorum approval,
wherein the HSM comprises a quorum web service Applications Programming Interface (API) to enforce quorum policy and handle quorum requests related to the quorum approval,
wherein the process daemon by way of the bridge device transfers an image from a dev-ops platform to the HSM responsive to the device app receiving the quorum approval for the user performing a code signing ceremony,
wherein the HSM securely signs the image using private keys thereon to produce a signed image during the code signing ceremony,
and thereafter, the process daemon by way of the bridge device transfers the signed image from the HSM back to the dev-ops platform;
wherein
a build server provides out-of-band resources on the out-of-band network comprising code, artifacts, audit logs, configuration files, and the image,
the dev-ops platform sourcing the image provides out-of-band services on the out-of-band network; and
the HSM hosting the code signing ceremony provides in-band resources and services on the in-band network to provide a secure computing environment with controlled ingress and egress of the image, data or artifacts.

2. The system of claim 1, wherein the constraint comprises
a temporal constraint with a time window having a fixed start point and either an end point or duration, and
the quorum approval is achieved when a predetermined number of authorizors have been authenticated and have authorized access to data, service or the HSM requested by the user in accordance with the temporal constraint.

3. The system of claim 1, wherein the constraint comprises
a physical constraint based on a geographic point at a precise location on the earth or within a configurable radius from a precise location on earth; and
the quorum approval is achieved when a predetermined number of authorizors have been authenticated and have authorized access to data, service or the HSM requested by the user in accordance with the physical constraint.

4. The system of claim 1, wherein authorizing temporary access is via a push action or a pull notification.

5. The system of claim 1, wherein the bridge device is configurable via a back-end cloud integration RESTful quorum API offered by the service provider.

6. The system of claim 1, wherein the bridge device is configurable via a gRPC quorum API offered by the service provider.

7. The system of claim 1, wherein the bridge device interchangeably couples the app to either of the in-band resources or the out-of-band resources indirectly via TCP/IP connection.

8. The system of claim 1, wherein the HSM includes one among a secure console, a Key Management System (KMS), another Hardware Security Module, or other secure device.

9. A method for authenticating multiple users to secure sensitive cloud assets, by way of a device app executing on a user device, that in response to a user requesting access to a Hardware Security Module (HSM) or data within a computing environment, performs the steps of:
authenticating the user requesting access to the HSM producing or consuming the data within the computing environment, wherein access to the HSM and data requires multi-user authentication from multiple authorizors; and
authorizing the user with a temporary access to data for use by a service within the computing environment upon determining a quorum approval in accordance with temporal and physical conditions,
where the device app:
authenticates the user and the multiple authorizors,
polls votes from the multiple authorizors to determines when the quorum approval for utilizing data is met within a constraint; and
enforces the temporal conditions and physical conditions on the temporary access to the HSM,
wherein the HSM comprises a quorum web service Applications Programming Interface (API) to enforce quorum policy and handle quorum requests related to the quorum approval, that by way of
a bridge device communicatively coupled to an in-band network and an out-of-band network connected to the HSM transfers data there between, and
a process daemon that is configurable via the device app controls an air-gapped switching of data between the secure in-band network and the out-of-band network responsive to the quorum approval,
wherein the process daemon by way of the bridge device transfers an image from a dev-ops platform to the HSM responsive to the device app receiving the quorum approval for the user performing a code signing ceremony,
wherein the HSM securely signs the image using private keys thereon to produce a signed image during the code signing ceremony,
and thereafter, the process daemon by way of the bridge device transfers the signed image from the HSM back to the dev-ops platform;
wherein
a build server provides out-of-band resources on the out-of-band network comprising code, artifacts, audit logs, configuration files, and the image,
the dev-ops platform sourcing the image provides out-of-band services on the out-of-band network; and
the HSM hosting the code signing ceremony provides in-band resources and services on the in-band network to provide a secure computing environment with controlled ingress and egress of the image, data or artifacts.

10. The method of claim 9, wherein the constraint comprises
a temporal constraint with a time window having a fixed start point and either an end point or duration, a physical constraint based on a geographic point at a precise location on the earth or within a configurable radius from a precise location on earth; and the quorum approval is achieved when a predetermined number of authorizors have been authenticated and have authorized access to data, service or the HSM requested by the user, in accordance with the temporal constraint and the physical constraint.

11. The method of claim 10, wherein the method includes notifying, by way of the device app, the authorizors that a request for using the HSM or accessing data is pending, and confirming a vote via a push action or a pull notification responsive to the notifying in accordance with the temporal constraint and the physical constraint.

* * * * *